United States Patent

[11] 3,532,198

| [72] | Inventor | Frederick E. Lederman<br>Huron, Ohio |
|---|---|---|
| [21] | Appl. No. | 792,365 |
| [22] | Filed | Jan. 21, 1969 |
| [45] | Patented | Oct. 6, 1970 |
| [73] | Assignee | General Motors Corporation<br>Detroit, Michigan<br>a corporation of Delaware |

[54] SPRAG CLUTCH
8 Claims, 5 Drawing Figs.

| [52] | U.S. Cl. | 192/45.1 |
|---|---|---|
| [51] | Int. Cl. | F16d 41/06 |
| [50] | Field of Search | 192/41.3, 45.1 |

[56] References Cited
UNITED STATES PATENTS

| 883,266 | 3/1908 | Wilkinson | 192/45.1UX |
|---|---|---|---|
| 2,630,896 | 3/1953 | Dodge | 192/45.1 |
| 2,888,116 | 5/1959 | Troendly et. al. | 192/45.1 |

*Primary Examiner*—Mark M. Newman
*Assistant Examiner*—Allan D. Herrmann
*Attorneys*—Warren F. Finken and F. J. Fodale ABSTRACT: An overrunning device having a plurality of sprags tiltably disposed between a pair of spaced flanges on the inner race. The sprags are spaced by a driving cage keyed to the outer race. Torque is transferred from the inner race to the outer race through the sprags and driving cage. The overrunning device also includes a phasing cage and a tickler spring urging the sprags toward wedging engagement with the inner race.

Patented Oct. 6, 1970
3,532,198
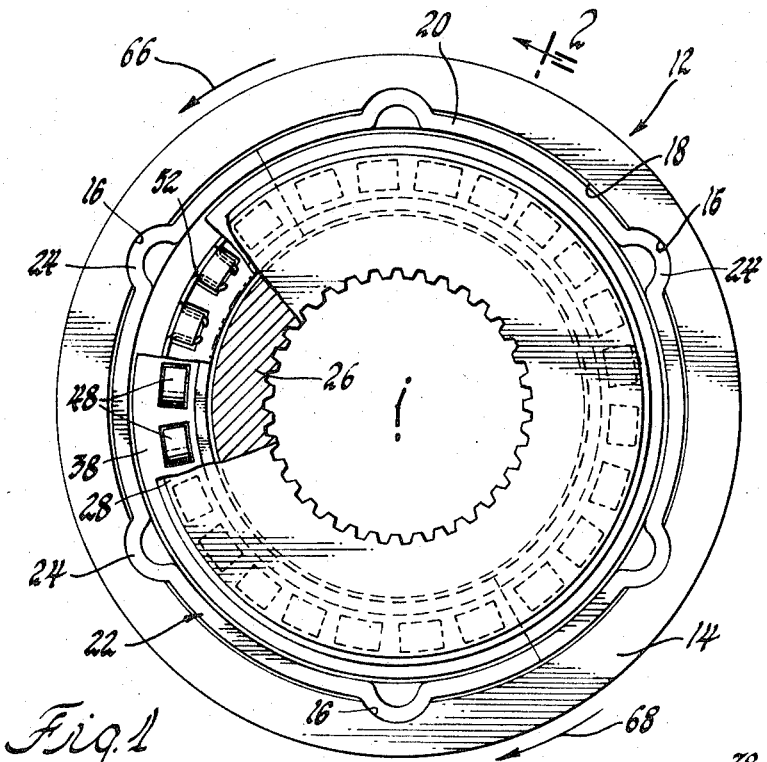
Fig.1
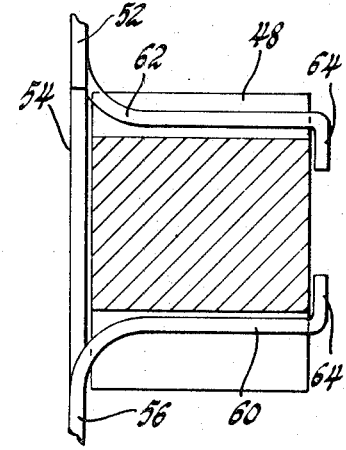
Fig.3
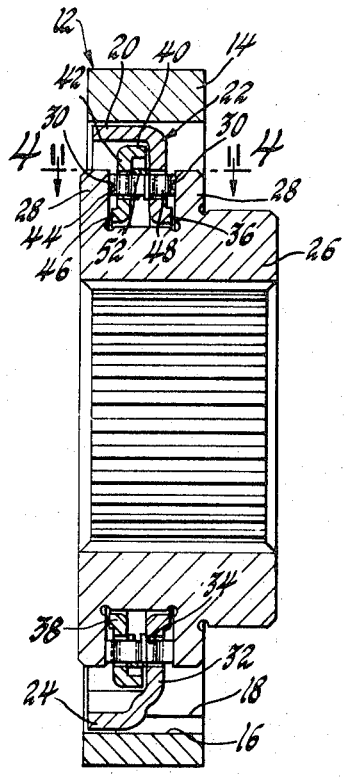
Fig.2
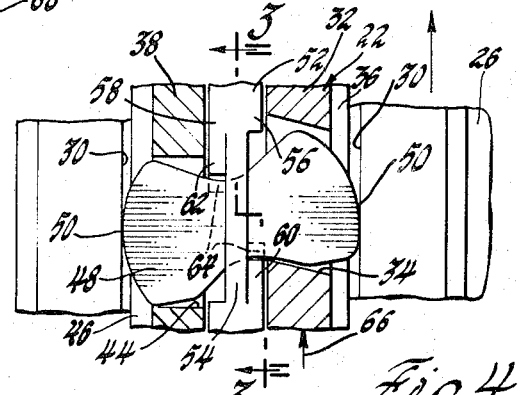
Fig.4
Fig.5
INVENTOR.
Frederick E. Lederman
BY
F. J. Fodale
ATTORNEY

SPRAG CLUTCH

SPECIFICATION

My invention relates generally to overrunning devices and more particularly to a sprag-type overrunning device.

All sprag-type overrunning devices used heretofore so far as I am aware have always used a wedging engagement of the sprags with both the inner and outer races to provide a lockup between the races. A principle feature of my sprag overrunning device is that the sprags are wedged into engagement between confronting surfaces on the same race to provide a lockup between the races. An inherent advantage to such an overrunning device utilizing this feature of my invention is that only the race providing the confronting surfaces into which the sprags are wedged need be hardened and ground. Stated another way, the other race need not be hardened and ground which in turn results in more economical manufacture since the heat treatment and final grinding operations need not be performed on the other race.

Another advantage realized from this feature is that it is easier from a manufacturing standpoint to space the sprag engagement surfaces within smaller tolerances when the surfaces are formed on the same part than when the confronting sprag engagement surfaces are formed on two relatively rotatable parts.

In the preferred embodiment described in this disclosure, the sprags are horizontally oriented which is an advantage in some applications where space requirements are such that space in the radial direction must be conserved. Thus, a sprag overrunning device in accordance with my invention is capable of higher torque capacities for a given amount of radial space.

Another feature of my invention resides in the wedging action of the sprags whereas in prior devices of this type, the sprags experienced a rolling action into their wedged engagement. In my device, the sprags experience a pure wedging action. This wedging action requires a greater release force at higher stress levels and consequently, an overrunning device according to my invention may be advantageously designed and used in situations where relatively high, momentary torque reversals are experienced and yet a release or overrun is not desired.

Another feature of my invention resides in the tickler spring which is of simple and efficient design; merely comprising a metal annulus having a number of spring fingers bent out of its marginal portions.

Other objects and many of the attendant advantages of this invention will be readily appreciated as the same becomes better understood by reference to the following detailed description when considered in connection with the accompanying drawings in which like reference numerals designate like parts through the figures thereof and wherein:

FIG. 1 is a frontal view partially broken away for clarity of an overrunning sprag device embodying my invention.

FIG. 2 is a section taken along the line 2-2 of FIG. 1 and looking in the direction of the arrows.

FIG. 3 is a section taken along the line 3-3 of FIG. 4 and looking in the direction of the arrows and shows the engagement of the spring fingers on the energizing spring with a sprag.

FIG. 4 is a section taken along the line 4-4 of FIG. 2 and looking in the direction of the arrows. It shows the position of the sprag in the lockup condition of the overrunning device.

FIG. 5 is a view similar to FIG. 4 except that it shows the position of the sprag and its associated parts in the overruning condition of the device.

Referring now to the drawings and more specifically to FIGS. 1 and 2, the overrunning device is indicated generally at 12. The outer race 14 of the overrunning device includes a number of circumferentially spaced recesses 16 opening into its bore 18. The outer flange 20 of a driving cage 22 is piloted in the bore 18 and includes a number of lugs 24 which are received in the recesses 16 keying the driving cage 22 to the outer race 14. The inner race 26 includes a pair of axially spaced flanges 28 with confronting annular faces 30 which are substantially parallel. The main body portion 32 of the driving cage 22 includes a plurality of windows 34 and extends into the annular space between the flanges 28 on the inner race 26 terminating in a short turned-out flange 36 at its inner circumferential edge. A second or phasing cage 38 also extends into the space between the flanges 28 of the inner race 26. The phasing cage 38 has a flange 40 at its outer margin so that the main body portion 42 which has a circumferentially spaced set of windows 44 is spaced from the body portion 32 of the driving cage 22 with its corresponding set of windows 34. The phasing cage 38 similarly has a short out-turned flange 46 at its inner margin.

A plurality of sprags 48 extends through the windows 34 in the driving cage 22 and a corresponding window 44 in the 30 phasing cage 38. Each sprag 48 has an hourglass configuration with arcuate end faces 50 engaging the confronting annular faces 30, respectively, on the inner race. The curvature of the end faces 50 is such that the sprags 48 wedgingly engage the faces 30 when in the position shown in FIG. 4. As the sprags 48 tilt to the position shown in FIG. 5, they are unwedged also due to the curvature of the end faces 50.

An energizing spring 52 is disposed between the driving cage 22 and the phrasing cage 38. The structure of the energizing spring is best understood in reference to FIGS. 3 and 4. The energizing spring 52 comprises an annular body 54 from which a plurality of spring fingers are cut and bent out of its axial margins 56 and 58, respectively. The spring fingers 60 depending from the right-hand margin portion 56 of the annular body as viewed in FIG. 3 engages the sprag on one of its axial surfaces at a point spaced from the tilt axis of the sprag. The spring finger 62 depending from the left-hand margin portion 58 of the body engages the sprag on the opposite axial face of the sprag at a point on the opposite side of the tilt axis of the sprag. The free ends of the spring fingers have tabs 64 which curve around the sprag as seen in FIG. 3. FIG. 4 shows the sprag 48 in its wedged position with respect to the flanges on the inner race. In this position, the spring fingers are unloaded since they span a minimum distance across the sprag. However, as the sprag tilts to the overrun position shown in FIG. 5, the spring fingers engage the sprag across a thicker portion and spread apart storing energy which tends to return the sprags toward their wedging position.

When relative rotation of the outer race 14 and driving cage 22 is attempted in the counterclockwise direction as indicated by the arrow 66, the sprags are tilted to the position shown in FIG. 4 and the sprag is wedged into the confronting surfaces 30 on the inner race and force is transmitted from the outer race 14 to the inner race 26 through the driving cage 22 and the sprags 48. Relative rotation of the outer race 14 and driving cage 22 in the opposite or clockwise direction as indicated by the arrow 68 in FIGS. 1 and 5 tilts the sprag into the position shown in FIG. 5 where the sprags are no longer wedged into the confronting surfaces and the outer race 14 freewheels or overruns with respect to the inner race 26. In this tilting movement, the function of the phasing cage 38 is to tilt all the sprags substantially in unison so that they all wedge substantially at the same time. It is to be noted that the spring fingers 60 and 62 in FIG. 5 are spread apart by the tilt of the sprag 48 thus producing a biasing force tending to return the sprags to the lockup position shown in FIG. 4.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

I claim:

1. an overrunning sprag device comprising in combination:
   a first race having a pair of spaced flanges with confronting surfaces;

a plurality of sprags located between said flanges and in engagement with said confronting surfaces;

a second race coaxial with said first race;

means on said second race circumferentially spacing said sprags, said means including fulcrum means for each of said sprags;

said sprags being tiltable about said fulcrum means into wedging engagement with said confronting surfaces in response to a relative rotation between said races in one direction whereby a force is transmitted between said races through said fulcrum means in said first direction; and said sprags being tiltable about said fulcrum means out of wedging engagement with said confronting surfaces in response to a relative rotation between said races in an opposite direction whereby one of said races overruns said other race in said opposite direction.

2. The overrunning sprag device as defined in claim 1 further including spring means operatively connected to said sprags, said spring means resiliently tilting said sprags toward wedging engagement with said confronting surfaces.

3. The overrunning sprag device as defined in claim 1 further including a phasing cage engaging said sprags and tilting said sprags substantially in unison.

4. The overrunning sprag device as defined in claim 2 further including a phasing cage engaging said sprags and tilting said sprags substantially in unison.

5. An overrunning sprag device comprising in combination:

a first race having a pair of spaced flanges with confronting surfaces;

a plurality of sprags located between said flanges with said sprags frictionally engaging said confronting surfaces;

a second race coaxial with said first race;

a driving cage on said second race, said driving cage having a plurality of windows, said sprags extending through said windows and being tiltable between a first position wherein said sprags wedgingly engage said confronting surfaces and a second position wherein said sprags are slideable on said confronting surfaces; and a phasing cage having a plurality of windows, said sprag extending through said windows, said phasing cage engaging said sprags to tilt them substantially in unison, and spring means operatively connected to said sprags biasing them toward said first position, said sprags being tiltable in response to the direction of relative rotation between said races whereby said races lock up through said sprags and driving cage in response to relative rotation between said races in one direction and are freely relatively rotatable in the opposite direction.

6. The overrunning clutch as defined in claim 5 wherein said spring means is an energizing spring having a plurality of sets of spring fingers, each set of spring fingers comprising a first spring finger engaging one side of one of said sprags at a first point spaced from its tilt center and a second spring finger engaging the opposite side of said one sprag at a second point spaced from said tilt center in the opposite direction from said first point.

7. An overrunning sprag device comprising in combination:

a first race having axially spaced flanges with substantially parallel confronting annular surfaces;

a second race;

a first cage having a rim portion and an annular portion with a plurality of windows, said rim portion being secured to said second race with said annular portion being disposed between said flanges on said first race;

a second cage having a second annular portion with a plurality of windows, said second annular portion being disposed between said flanges and spaced from said annular portion of said first race;

a sprag extending through each window in said first cage and a corresponding window in said second cage, opposite ends on said sprags engaging said parallel confronting annular surfaces, respectively, with said sprags being tiltable between a sliding engagement position and a wedging engagement position with said annular surfaces; and an energizing spring disposed between said cages, said spring comprising, an annular body portion engaging a circumferential surface on said sprags, a plurality of sets of spring fingers depending from said body portion, each of said sets of spring fingers comprising two fingers depending from opposite sides of said body portion and engaging the opposite axial face of a sprag, respectively.

8. An energizer spring for a sprag clutch comprising:

an annular body portion;

a first set of circumferentially spaced spring fingers depending from one axial margin of said body portion; and a second set of circumferentially spaced spring fingers depending from the other axial margin of said body portion, said first set of circumferentially spaced spring fingers being indexed with respect to said second set whereby each spring finger of said first set and a corresponding spring finger from said second set are adapted to receive a sprag therebetween.